US012369181B2

(12) United States Patent
Ambati et al.

(10) Patent No.: US 12,369,181 B2
(45) Date of Patent: Jul. 22, 2025

(54) METHODS AND SYSTEMS FOR PERFORMING RESERVATIONS WITH OVERBOOKING

(71) Applicant: Telefonaktiebolaget LM Ericsson (publ), Stockholm (SE)

(72) Inventors: Suresh Babu Ambati, Guntur (IN); Magnus Wedelin, Karlshamn (SE); Alexandre Carvalho Lousada, Lyckeby (SE); Leila Negris Bezerra, Rio de Janeiro (BR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 389 days.

(21) Appl. No.: 17/926,578

(22) PCT Filed: Mar. 4, 2021

(86) PCT No.: PCT/EP2021/055439
§ 371 (c)(1),
(2) Date: Nov. 19, 2022

(87) PCT Pub. No.: WO2021/233582
PCT Pub. Date: Nov. 25, 2021

(65) Prior Publication Data
US 2023/0189326 A1 Jun. 15, 2023

(30) Foreign Application Priority Data
May 20, 2020 (IN) .............................. 202011021291

(51) Int. Cl.
*H04W 72/566* (2023.01)
*G06F 9/50* (2006.01)

(52) U.S. Cl.
CPC ......... *H04W 72/566* (2023.01); *G06F 9/5011* (2013.01); *G06F 2209/5014* (2013.01)

(58) Field of Classification Search
None
See application file for complete search history.

(56) References Cited

U.S. PATENT DOCUMENTS

| 9,953,351 | B1 * | 4/2018 | Sivasubramanian ....................... G06Q 30/0283 |
| 2019/0182838 | A1 * | 6/2019 | Bondarenko ..... H04M 15/7652 |
| 2021/0152488 | A1 * | 5/2021 | Dey ....................... H04M 15/31 |

FOREIGN PATENT DOCUMENTS

| WO | WO 2016/188706 A1 | 12/2016 | |
| WO | WO-2017222434 A1 * | 12/2017 | .............. H04L 12/14 |
| WO | WO-2021213722 A1 * | 10/2021 | .......... H04L 12/1407 |

OTHER PUBLICATIONS

International Search Report and Written Opinion of the International Searching Authority, PCT/EP2021/055439, mailed May 21, 2021, 13 pages.

* cited by examiner

*Primary Examiner* — Anh Vu H Ly
(74) *Attorney, Agent, or Firm* — Sage Patent Group (57) ABSTRACT

Systems and methods are provided for reserving resources in a telecommunication network. The method including: receiving, at a node, a first service request to reserve a quantity of resources from a subscriber's first account, wherein the quantity of resources requested to be reserved are greater than an amount of available resources in the subscriber's first account; determining, at the node, that the quantity of resources needed to be reserved is within an overbooking limit associated with the subscriber's first account; and reserving, based on the determining step, the requested quantity of resources.

20 Claims, 8 Drawing Sheets

METHODS AND SYSTEMS FOR PERFORMING RESERVATIONS WITH OVERBOOKING

CROSS REFERENCE TO RELATED APPLICATIONS

This application is a 35 U.S.C. § 371 national stage application of PCT International Application No. PCT/EP2021/055439 filed on Mar. 4, 2021, which in turn claims foreign priority to Indian Patent Application number 202011021291, filed on May 20, 2020, the disclosures and content of which are incorporated by reference herein in their entirety.

TECHNICAL FIELD

The present invention generally relates to communication networks and, more particularly, to mechanisms and techniques for charging systems.

BACKGROUND

Over time the number of products and services provided to users of telecommunication products has grown significantly. For example, in the early years of wireless communication, devices could be used for conversations and later also had the ability to send and receive text messages. Over time, technology advanced and wireless phones of varying capabilities were introduced which had access to various services provided by network operators, e.g., data services, such as streaming video or music service. More recently there are numerous devices, e.g., so called "smart" phones and tablets, which can access communication networks in which the operators of the networks, and other parties, provide many different types of services, applications, etc. Accordingly, there need to be methods and systems for efficiently charging for services, particularly, as service offerings exist in a dynamic environment with expectations of increased volume and new types of services becoming available.

Regarding the charging for services, currently there is an Online Charging System (OCS) that supports unit (resource) reservation, either Event Charging with Unit Reservation (ECUR) or Session Charging with Unit Reservation (SCUR). These two existing solutions for charging subscribers for services focus on guaranteeing that when reported, consumed units are to be charged. These charged resources will be deducted following the corresponding previous resource reservations. Current systems also aim to ensure that reserved units for one service cannot be deducted by another service reporting consumptions. Deduction requests follow their own corresponding reservations, i.e., these deduction requests cannot take resources from other reservations.

The traditional approach of granting requested units for a service charging request considers only the portion of the subscriber's balance that is not reserved for any other parallel service request. This solution assumes that reserved units will be entirely deducted later. Thus, "reserved units" are locked, preventing other service charging requests to reserve from them. However, these reserved units do not always correspond to consumed units in the future when consumption gets reported. A consequence of this behavior is that after deduction, a subscriber may still have remaining units in higher prioritized balances associated with the subscriber's accounts, which were reserved but were not deducted. Those units, belonging to the higher prioritized balance(s), were prevented from being reserved by other service requests.

Granting units considering only the available balance, with available balance being equal to the account balance minus the reserved units, may result in service denial for the case when the current balance is totally reserved. Even if later the actual subscriber's service usage reported by the network happens to be a partial consumption or even zero consumption of the existing reservations. Therefore, reserved units should be viewed as a speculation of what could be consumed, since there is no guarantee about how many resources will actually be consumed.

Thus, there is a need to provide methods and systems that overcome the above-described drawbacks associated with resource reservation.

SUMMARY

Embodiments allow for reserving resources and using an overbooking mechanism in a telecommunication network. This allows the operator of the telecommunication network to support uninterrupted service until full depletion of applicable accounts for the subscriber. Therefore, operators can provide a better user experience by having fewer complaints as accounts are depleted according to a defined priority order.

According to an embodiment, there is a method for reserving resources in a telecommunication network. The method comprising: receiving, at a node, a first service request to reserve a quantity of resources from a subscriber's first account, wherein the quantity of resources requested to be reserved are greater than an amount of available resources in the subscriber's first account; determining, at the node, that the quantity of resources needed to be reserved is within an overbooking limit associated with the subscriber's first account; and reserving, based on the determining step, the requested quantity of resources.

According to an embodiment, there is a node in a telecommunication system for reserving resources in a telecommunication network. The node comprising: a communication interface configured to receive a first service request to reserve a quantity of resources from a subscriber's first account, wherein the quantity of resources requested to be reserved are greater than an amount of available resources in the subscriber's first account; a processor configured to determine that the quantity of resources needed to be reserved is within an overbooking limit associated with the subscriber's first account; and the processor configured to reserve, based on the determining step, the requested quantity of resources.

According to an embodiment, there is a computer-readable storage medium containing a computer-readable code that when read by a processor causes the processor to perform a method for reserving resources in a telecommunication network. The method comprising: receiving, at a node, a first service request to reserve a quantity of resources from a subscriber's first account, wherein the quantity of resources requested to be reserved are greater than an amount of available resources in the subscriber's first account; determining, at the node, that the quantity of resources needed to be reserved is within an overbooking limit associated with the subscriber's first account; and reserving, based on the determining step, the requested quantity of resources.

According to an embodiment, there is an apparatus adapted to receive a first service request to reserve a quantity of resources from a subscriber's first account, wherein the quantity of resources requested to be reserved are greater than an amount of available resources in the subscriber's first account; to determine that the quantity of resources needed to be reserved is within an overbooking limit associated with the subscriber's first account; and to reserve, based on the determining step, the requested quantity of resources.

According to an embodiment, there is an apparatus comprising: a first module configured to receive a first service request to reserve a quantity of resources from a subscriber's first account, wherein the quantity of resources requested to be reserved are greater than an amount of available resources in the subscriber's first account; a second module configured to determine that the quantity of resources needed to be reserved is within an overbooking limit associated with the subscriber's first account; and a third module configured to reserve, based on the determining step, the requested quantity of resources.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The embodiments to be discussed next are not limited to the configurations described below, but may be extended to other arrangements as discussed later.

Reference throughout the specification to "one embodiment" or "an embodiment" means that a particular feature, structure or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

As described in the Background section, there are problems associated with resource reservation. Embodiments described herein support a so-called "Reservations with Overbooking" mechanism which provides the potential for reserving additional resources (also known as units) on top of a subscriber's current account balance when granting requested resources for a service charging request. This Reservations with Overbooking mechanism allows for parallel service requests associated with the subscriber to reserve resources from the current balance while also considering a resource limit which is not necessarily fixed, e.g., the resource limit can have a variable cap limit. For example, as long as overbooking resources are still available to the subscriber, the subscriber's service request and/or the service itself will not be denied, as long as the subscriber's current balance is not depleted completely. Services can include videos, calls, games and other applications and/or content to be provided by or through the operator network. Further, embodiments described herein can also be applicable to shared accounts, e.g., where multiple subscribers use the account simultaneously.

According to an embodiment, the usage of overbooking also tends to ensure that a higher prioritized account balance, or bucket of resources, will be consumed first, when multiple account balances are available for use by the subscriber. Personalization can indicate if a given balance allows reservations with overbooking and the amount for the overbooking resource cap. This allows the operator of the telecommunication network to control potential losses while deducting reported consumption for a service request. If an account balance does not allow for overbooking, service requests will not be allowed to reserve beyond the available current balance. This can be personalized by account types, by subscriber, by organization and/or other methods as determined by the operator.

According to an embodiment, reservations with overbooking can support uninterrupted service until applicable balances are depleted completely or, in some cases, until a preset negative balance level is achieved. When enabling this feature, the operator of the telecommunication system (or network) accepts the possibility to incur some losses to provide a better user experience. To allow for control of the maximum losses that the operator is willing to accept for each subscriber balance, embodiments propose and describe the configuration of an overbook limit, for example, allowed data units accessible above a current subscriber threshold of data. The operator can set for which balance or balances for one or more subscribers for which possible losses are acceptable. According to an embodiment, the overbook limit can be the number of units allowed to be reserved from a given account on top of the currently available units as decided by the operator. According to an alternative embodiment, the overbook limit can be a variable amount determined by the operator. It is to be understood that while many examples of units described herein are associated with non-monetary units, e.g., data, monetary units, e.g., euros, are also applicable for certain situations and/or accounts as desired by the operator.

Figure 1:
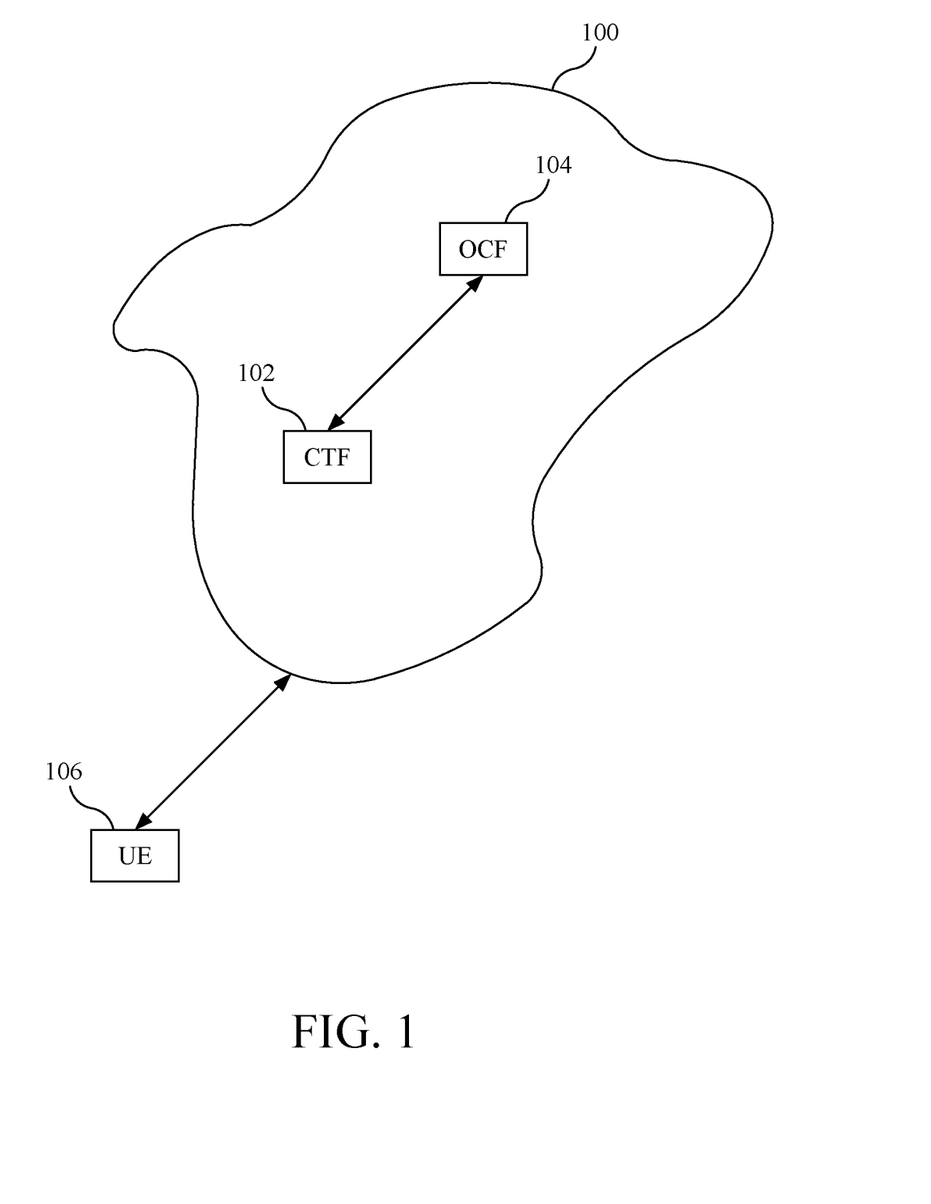
FIG. 1 illustrates an architecture according to an embodiment.

According to an embodiment, FIG. 1 illustrates an architecture which includes the nodes/functions used in support of the reservations with overbooking mechanism. More specifically, FIG. 1 shows a User Equipment (UE)-A 106 which is in communication with an operator network 100 (which is also a telecommunication network). The operator network 100 includes various nodes which have various methods for communicating with each other and/or getting information to/from the UE-A 106. Shown in operator network 100 are a Charging Trigger Function (CTF) 102, which can be implemented on a node, and an Online Charging Function (OCF) 104 which also can be implemented on a node. To simplify FIG. 1, the CTF 102 and the OCF 104 are the only nodes shown in the operator network 100 as they are the nodes of interest within the operator network 100 for discussion of embodiments herein. However, it is to be understood that other nodes exist which are not shown here through which communications associated with embodiment can be passed through.

Figure 2:
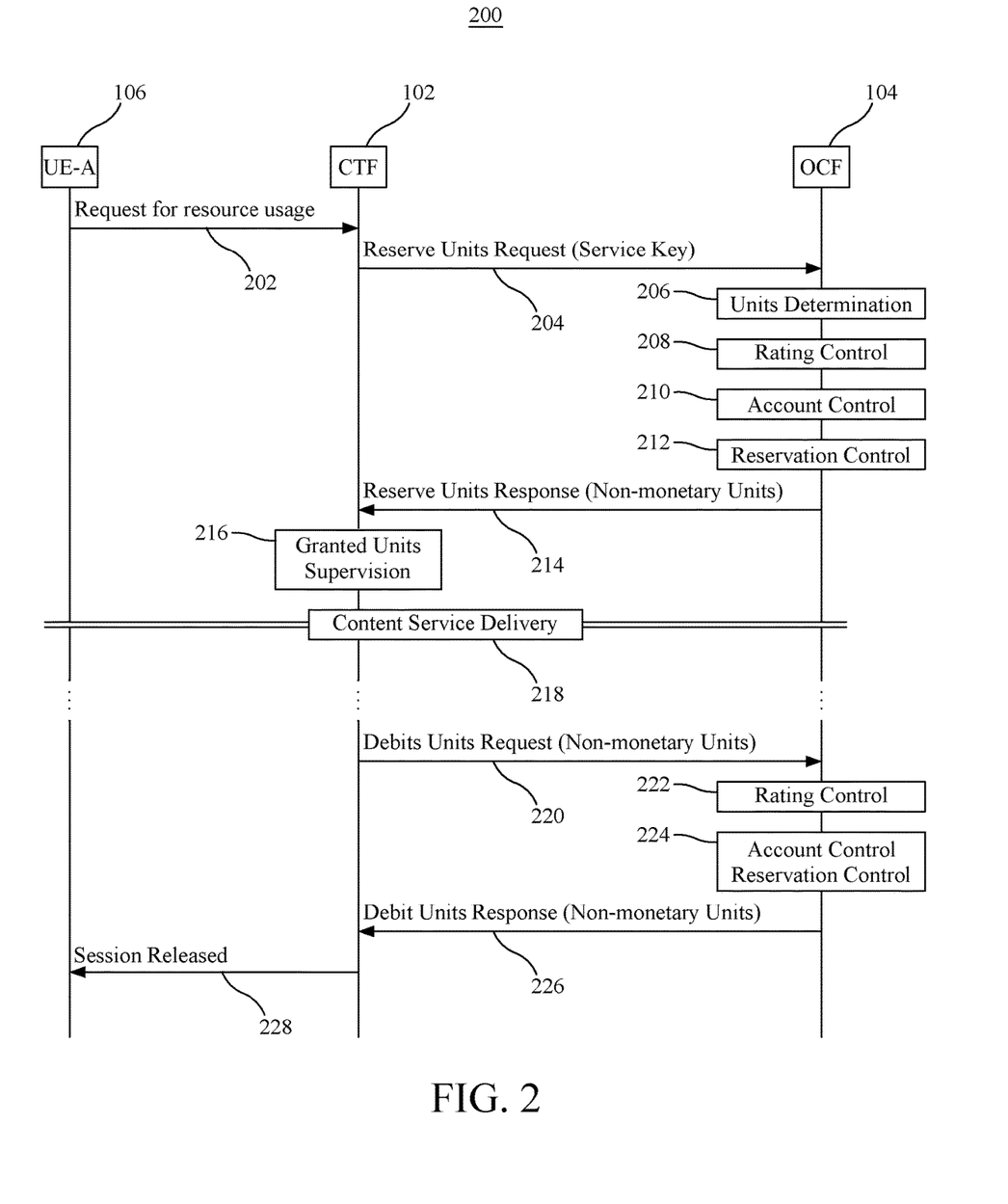
FIG. 2 shows a signaling diagram according to an embodiment.

According to an embodiment, FIG. 2 shows a signaling diagram 200 associated with the overbooking mechanism. The signaling diagram 200 shows communications between the UE-A 106, the CTF 102 and the OCF 104. Initially, the UE-A 106 requests the desired content from the CTF 102 as shown in the Request for resource usage message 202. The CTF 102, depending on the service requested by the UE-A 106, determines the service key and forwards the Reserve Units Request message 204 with a service key to the OCF 104.

The OCF 104, in Units Determination block 206, determines the number of non-monetary units needed for the content/service delivery, based on the received service key. The OCF 104 assisted by a rating entity then, in Rating Control block 208, calculates the number of monetary units that represent the price for the number of units determined in the Units Determination block 206. The OCF 104, as shown in Account Control block 210, checks whether a subscriber's account balance, associated with the desired content request, is sufficient for the requested reservation. Further, according to an embodiment, when a given service allows for overbooking from an account during the reservation phase, subsequent service requests will still be allowed to reserve units from the account, as long as its balance is not completely deducted. This can also occur if a subscriber has other accounts with resources/units to deduct from. Note that, determination of needed units for the service request need not only be based on the received service key. For example, the needed units could also be determined based on other parameters in the request like the requested service units, etc. The units needed to be reserved for the service request could also be based on Rating Control applicable for the service in the OCF 104. The units needed to be reserved could also be based on the type of units available for the subscriber and the type of units that the given service is allowed to reserve for the subscriber, at the OCF 104. Moreover, according to an embodiment, in the OCF 104, once the Rating Control block 208 is executed for the service requested, the focus is upon what is needed to be reserved in the Account Control block 210. This is because what is requested by the network may not always make sense, by comparison, to the Account Control block 210 in some cases.

If the subscriber's account balance is sufficient, then the corresponding reservation is made by the OCF 104 as shown by Reservation Control block 212. In this example, units from higher priority resource buckets are already reserved for other service requests and overbooking is allowed. Hence, for this service request, units are reserved from the overbooking allowed by the account.

According to an embodiment, the OCF 104 informs the CTF 102 of the reserved number of non-monetary units as shown in Reserve Units Response message 214. This includes the case where the number of units reserved indicates the permission to render the service that was identified by the received service key. The Granted Units Supervision block 216 performed by the CTF 102 is the process by which the CTF 102 monitors the consumption of the reserved units and can operate simultaneously with or in conjunction with the service delivery to the UE-A 106. Content/Service Delivery block 218 represents the CTF 102 delivering the content/service which can happen at once, in fractions of the total, or in individually chargeable items, corresponding to the reserved number of units.

Next, a Debit Units Request message 220 is transmitted from the CTF 102 to the OCF 104 which includes the request to debit the amount of units corresponding to the consumed number of units. The OCF 104, as assisted by the rating entity, calculates the number of monetary units to deduct from the subscriber's account as shown by Rating Control block 222.

According to an embodiment, block 224 includes Account Control and Reservation Control at the OCF 104. With respect to Account Control, the OCF 104 triggers the deduction of the calculated amount from the subscriber's account. For this example, at the time of deduction for the present service request, if the reservation for the service is made against overbooking allowed by an account, the service reported consumption will be deducted from the account, as long as the account is not deducted completely.

After completion of the various potential operations associated with Account Control and Reservation Control in block 224, the OCF 104 informs the CTF 102 of the actually deducted non-monetary units as shown in Debit Units Response message 226. The CTF 102 can then release the session with the UE-A 106 as shown by the Session Release message 228.

It is to be understood that signaling diagram 200 is just one example of signals, flows and diagrams representing such that can be associated with, or be used to described signals, that can be used in the reservation process, and more specifically, when implementing the overbooking mechanism described herein.

According to an embodiment, the personalization of the overbook limit can be applied at different levels. For example, reservations with overbooking can be enabled for product offerings intended for prepaid subscriptions. An operator can also differentiate overbooking settings from customer to customer. For example, the operator may decide to offer a better user experience to loyal customers, by activating overbooking, with the confidence that possible losses may be recovered with the next recharge to the customer(s). Based on the configuration for the overbook limit, the OCF 104 will then support the possibility to allow reserving units accordingly. A given reservation request will reserve units from overbooking while there are units still available in the subscriber's account, and up to the overbooking limit.

Figure 3:
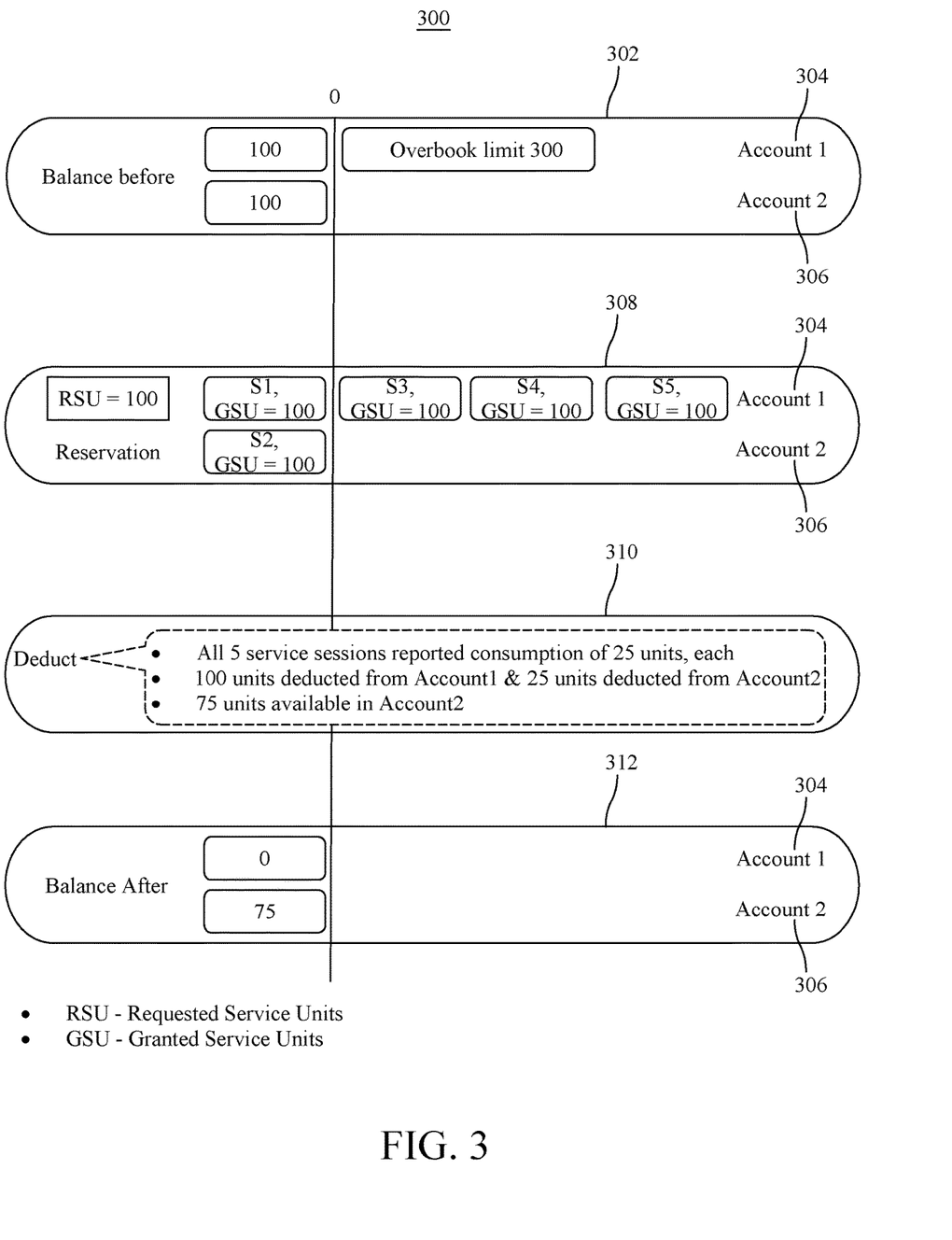
FIG. 3 illustrates a use example according to an embodiment.

According to an embodiment, FIG. 3 shows a use example 300 in which the operator wants to allow reservation of units to the extent of an overbooking limit allowed for an account. This allows for complete consumption of units of the account to be attempted, if needed, before denying the requested service, due to a lack of available balance. For this example 300 Account1 304 has a higher priority than Account2 306. Initially, as shown in area 302, Account1 and Account2 are both left with 100 units and Account1 has an overbooking limit configured with 300 units. Six parallel sessions were requested for 100 units each. However, as shown in area 308, five sessions (S1, S2, S3, S4 and S5) each with 100 requested service units (RSUs) with one of the six parallel sessions not being shown as it was denied due to no more available unit balance even when considering the overbooking limit. It can also be seen that each of the five sessions (51, S2, S3, S4 and S5) has been granted 100 granted service units (GSUs) with sessions S1 and S3-S5 being associated with Account1 304 and S2 being associated with Account2 306.

Area 310 describes the deduction phase. In this example, all five sessions (S1-S5) reported consumption of 25 units each, 100 units are deducted from Account1 304 and 25 units are deducted from Account2 306. This shows a final balance in area 312 of zero units for Account1 304 and 75 units for Account2 306.

Figure 4:
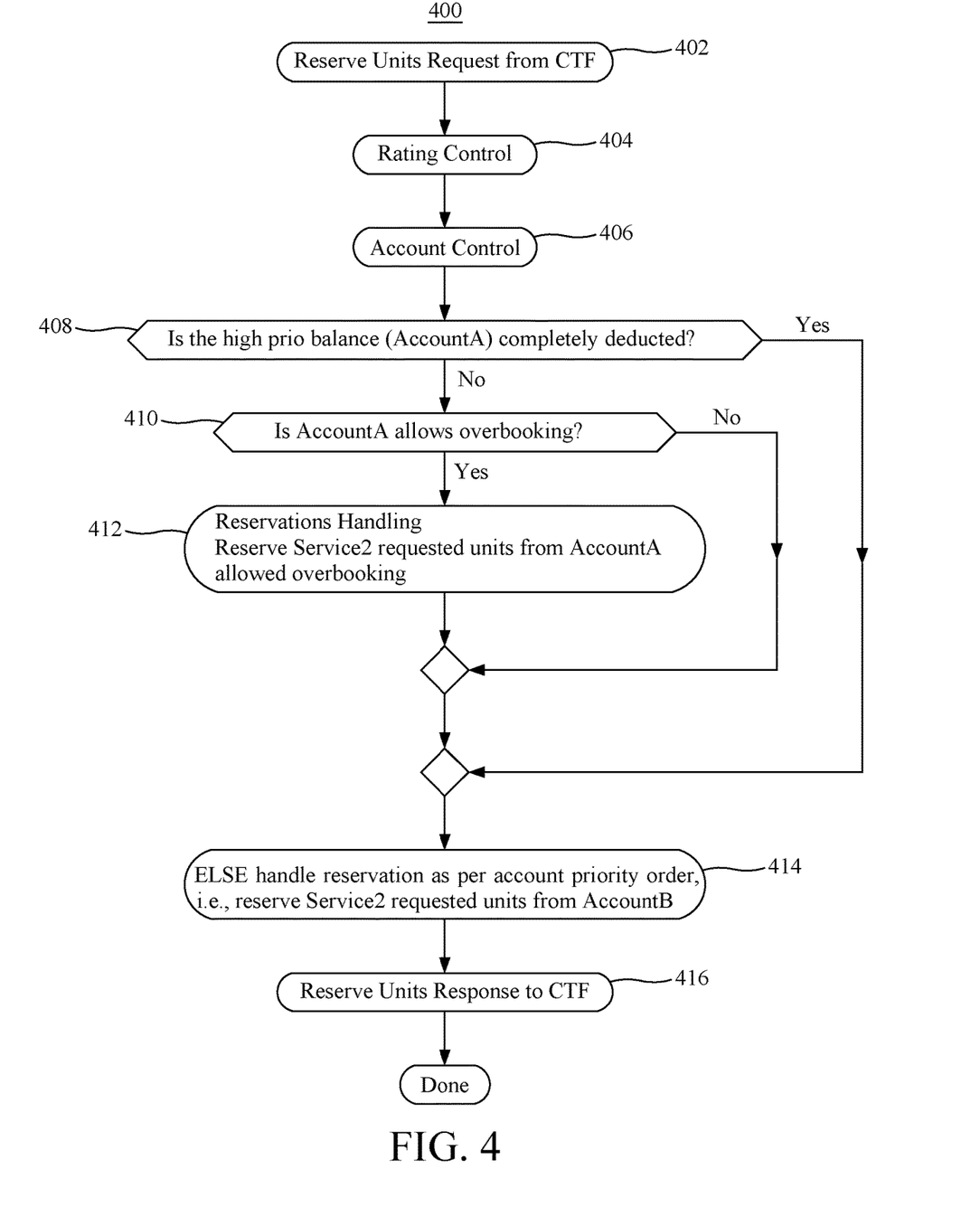
FIG. 4 shows a flowchart of a reservation phase according to an embodiment.
Figure 5:
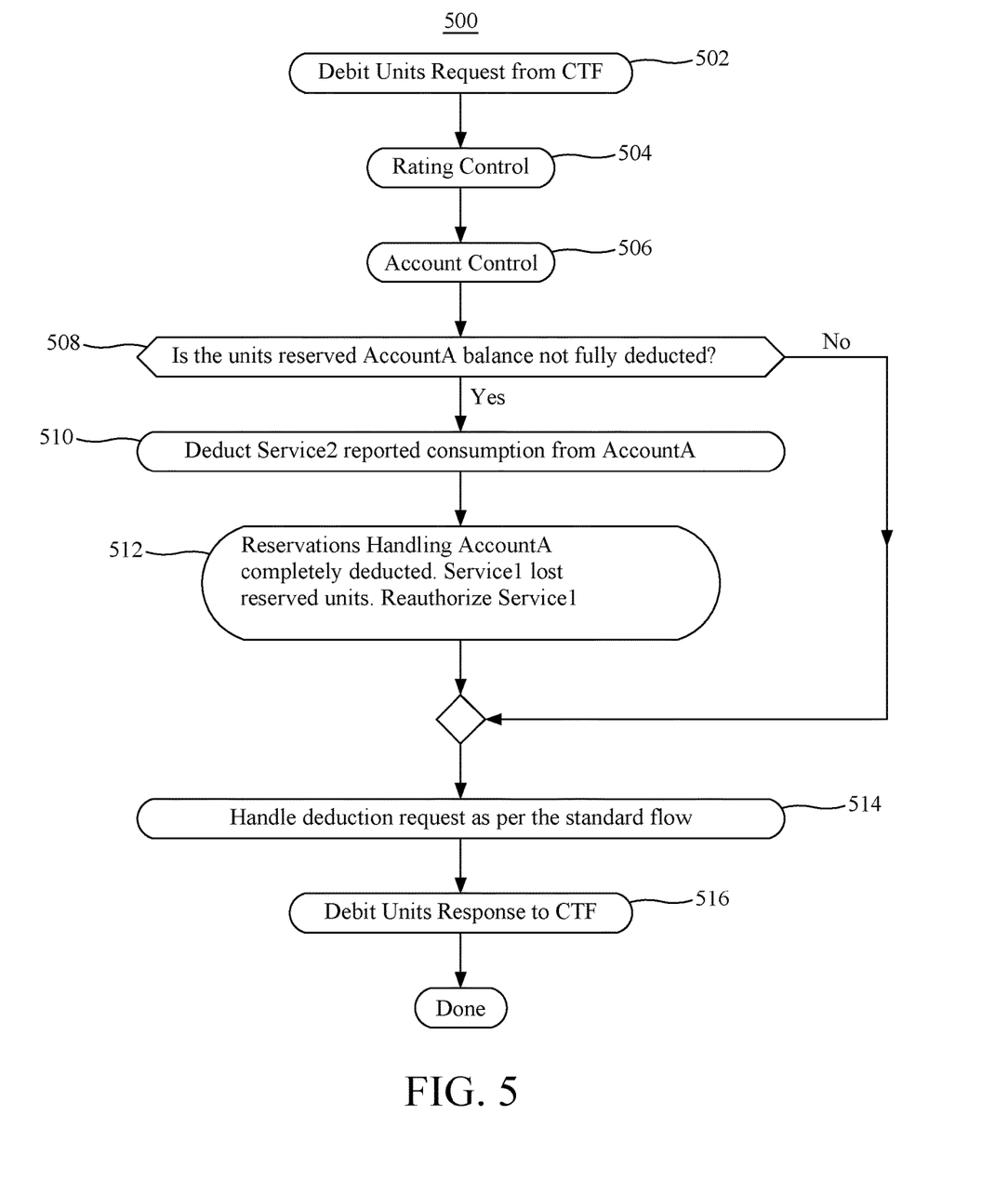
FIG. 5 illustrates a flowchart of a deduction phase according to an embodiment.

According to an embodiment, an example scenario in which two parallel service access requests occur will now be described. Initially, the subscriber has two balances, and AccountA with a high priority (high prio) and a second account, AccountB, with a lower priority (low prio) for data service charging. The subscriber has initiated two parallel service access requests, e.g., Service1 and Service2, both of which are eligible to deduct from both AccountA and AccountB. This example scenario will now be described in more detail below with respect to FIGS. 4 and 5. FIG. 4 shows a flowchart 400 of the reservation phase associated with this example and FIG. 5 illustrates a flowchart 500 of the deduction phase for this example.

Initially, in the flowchart 400 of the reservation phase, in step 402, the OCF 104 receives a Reserve Units Request message from the CTF 102. In step 404, rating control occurs and in step 406 account control occurs, with both steps 404 and 406 occurring at the OCF 104. In step 408 it is determined whether the high priority balance, AccountA is empty. If the determination in step 408 is a yes, then the charging system then handles the reservation request per account priority order, i.e., reserve the Service2 requested units from AccountB, occurs in step 414. Then the OCF 104 transmits the Reserve Units Response to the CTF 102 as shown in step 416 and the process ends.

If the determination in step 408 is a no, then in step 410 a check is made to determine if AccountA allows for overbooking. If the determination in step 410 is a yes, then in step 412, Reservations Handling, Reserve Service2 requested units from AccountA, which allows overbooking, occurs. Then, as the step 412 occurred, the ELSE condition in step 414 is not triggered. Then the OCF 104 transmits the Reserve Units Response to the CTF 102 as shown in step 416 and the process ends.

If the determination in step 410 is a no, then handle the reservation request per account priority order as shown in step 414 occurs, i.e., reserve the Service2 requested units from AccountB. Then the OCF 104 transmits the Reserve Units Response to the CTF 102 as shown in step 416 occurs and the process ends.

Initially, in the flowchart 500 of the deduction phase, it is to be understood that Service2 received its reserved units based on overbooking allowed by AccountA. For the deduction phase, in step 502, the Debit Units Request is received by the OCF 104 from the CTF 102. In step 504, rating control occurs and in step 506 account control occurs, with both steps 504 and 506 occurring at the OCF 104. In step 508 it is determined whether or not the units reserved in AccountA's balance are not fully deducted. If the determination is a no, then in step 514, the process handles the deduction request as per the standard flow, e.g., per current standards. Then, in step 516, a Debit Units Response is sent to the CTF 102 from the OCF 104 and the process ends.

If, in step 508, it is determined that the units reserved in AccountA's balance are not fully deducted, i.e., a yes determination, then in step 510 deduction of Service 2's reported consumption from AccountA occurs. Otherwise, if the deduction for Service 2's reported consumption already happened on Account A, i.e., a no determination, then the flow proceeds to block 514 described below. Then Reservations Handling occurs in step 512, which includes, AccountA completely deducted using some or all of Service1's reserved units. Service1's lost reserved units can then be refilled as seen by the Reauthorize Service1 in step 512, or this could result in termination of Service1 consumption for the subscriber. Then, in step 514, the process handles the deduction request as per the standard flow, e.g., per current standards. Then, in step 516, a Debit Units Response is sent to the CTF 102 from the OCF 104 and the process ends.

According to an embodiment, the overbooking concept described herein applies only to the reservation of units. The actual consumption of units can only be deduced from the current balance itself. No deduction is executed for overbooking. Once a balance is fully depleted, even though there is an overbook limit allowed for that balance and the allowed overbook limit is not fully reserved, no further reservation(s) shall be allowed from that balance overbook limit. According to an embodiment, this could be an operator choice. For example, if the operator wants to allow a preset overbooking limit always, irrespective of whether the account has any actual balance or not to debit the subscriber after service completion.

Figure 6:
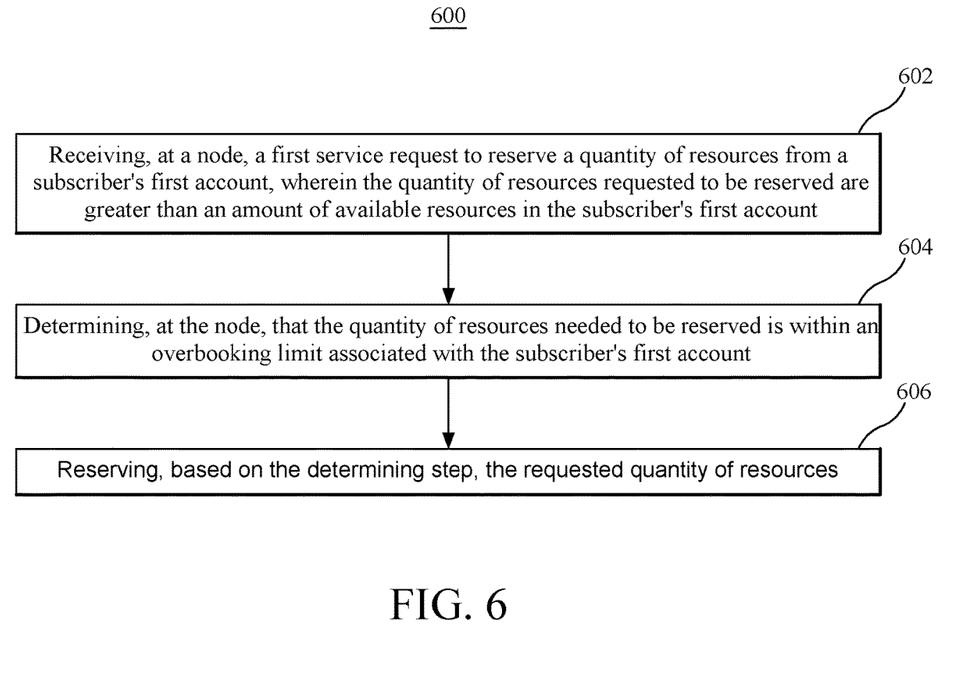
FIG. 6 shows a flowchart for reserving resources according to an embodiment.

According to an embodiment, there is a method 600 for reserving resources in a telecommunication network as shown in FIG. 6. The method includes: in step 602 receiving, at a node, a first service request to reserve a quantity of resources from a subscriber's first account, wherein the quantity of resources requested to be reserved are greater than an amount of available resources in the subscriber's first account; in step 604, determining, at the node, that the quantity of resources needed to be reserved is within an overbooking limit associated with the subscriber's first account; and in step 606, reserving, based on the determining step, the requested quantity of resources.

While embodiments are typically described herein with respect to a service request requesting reservation of an amount of resources greater than an amount in a subscriber's account, it is to be understood that there can be more than one service request received which attempts to utilize the overbooking mechanism. Additionally, according to an embodiment, the maximum overdraft is controlled by the operator which sets the overbooking limit. This limit can be changed as desired by the operator over time for any of the operator's subscribers. Further, an operator can either set up an automatic or manual process to debit subscribers for negative balances which can occur from processes described herein.

To further describe the embodiments, two uses cases are now presented. In the first use case, which is an example using a partial overbooking, a charging client requests a reservation for 100 MB of usage while there is only 90 MB left in the subscriber's account. The overbooking limit is 50 MB, therefore the request can be granted with the operator using 10 MB of the overbooking limit.

In the second use case describing a minimum reservation size associated with a service, a charging client requests a reservation for 100 MB usage while there is only 10 MB left in the subscriber's account. The overbooking limit is 50 MB. This full request cannot be granted, however, there is a minimum reservation size for this specific service set to 60 MB. Therefore, the request is granted for the specific service minimum of 60 MB by using the subscriber's remaining 10 MB and the full 50 MB of allowed overbooking for this subscriber.

So, it is to be understood that embodiments describe and allow for using a part or all of the overbooking amounts associated with the subscriber.

According to an embodiment, a subscriber may have more than one account to reserve from for a given service request. Thus, when one or more of the accounts belongs to a subscriber is offering overbooking possibility, then reservations from overbooking limit(s) may come into effect after either the overbooking account balance is fully reserved, e.g., the example described with respect to FIG. 3, or for the total balance of all accounts available for the subscriber are fully reserved, e.g., as described with respect to FIGS. 4 and 5. These constraints can be imposed to maintain consistency while allowing reservations from overbooking, i.e., maintaining a fictitious balance on top of the subscriber's actual balance. This can also be realization specific, for example, when a subscriber obtains more than one account. Additionally, according to an embodiment, overbooking comes into use during the reservation phase. Therefore, during the deduction phase, the reported consumption cannot be deducted from the overbooking units allowed on a given account.

Figure 7:
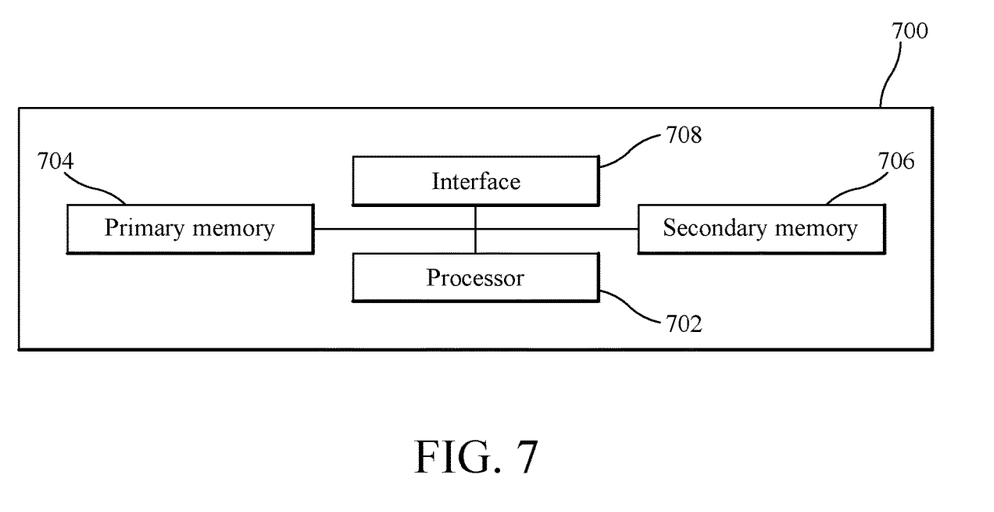
FIG. 7 depicts a communication node according to an embodiment.

Embodiments described above can be implemented in one or more nodes (or servers). An example of a communication node 700 is shown in FIG. 7. The communication node 700 (or other network node) includes a processor 702 for executing instructions and performing the functions described herein, e.g., the functions performed by the CTF 102, the OCF 104 and the UE-A 106. The communication node 700 also includes a primary memory 704, e.g., random access memory (RAM) memory, a secondary memory 706 which can be a non-volatile memory, and an interface 708 for communicating with other portions of a network or among various nodes/servers in support of charging.

Processor 702 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other communication node 700 components, such as memory 704 and/or 706, node 700 functionality in support of the various embodiments described herein. For example, processor 702 may execute instructions stored in memory 704 and/or 706.

Primary memory 704 and secondary memory 706 may comprise any form of volatile or non-volatile computer readable memory including, without limitation, persistent storage, solid state memory, remotely mounted memory, magnetic media, optical media, RAM, read-only memory (ROM), removable media, or any other suitable local or remote memory component. Primary memory 704 and secondary memory 706 may store any suitable instructions, data or information, including software and encoded logic, utilized by node 700. Primary memory 704 and secondary memory 706 may be used to store any calculations made by processor 702 and/or any data received via interface 708.

Communication node 700 also includes communication interface 708 which may be used in the wired or wireless communication of signaling and/or data. For example, interface 708 may perform any formatting, coding, or translating that may be needed to allow communication node 700 to send and receive data over a wired connection. Interface 708 may also include a radio transmitter and/or receiver that may be coupled to or a part of the antenna. The radio may receive digital data that is to be sent out to other network nodes or wireless devices via a wireless connection. The radio may convert the digital data into a radio signal having the appropriate channel and bandwidth parameters. The radio signal may then be transmitted via an antenna to the appropriate recipient.

Embodiments allow for adding an additional limit, known as overbooking, on top of the balance limit when reserving units for a charging service request. It is possible to configure whether overbooking is allowed or not allowed for each account and what limit should be applied to each account. Using the processes described herein, it is possible for the operator of the telecommunication network to support uninterrupted service until full depletion of applicable accounts. Therefore, operators can provide a better experience, having fewer complaints as accounts are depleted according to the defined priority order. This also allows for proper execution of operator designed activities based on account consumption status. For example, embodiments support operators that have promotions granting benefits in association to the consumption of a certain threshold in a balance. Further, configurability of which accounts are the target accounts for which the operator wants to implement overbooking, e.g., where losses are acceptable, are enabled.

Embodiments provide various advantages or improvements for charging for services in a telecommunications network. According to an embodiment, accepting overbooking aims for and allows for a charging service request to not be denied due to parallel reservation requests competing for resources until the applicable balances are depleted completely. This feature provides a better user experience by, for example, providing uninterrupted service to users. The configuration of the overbooking limit allows for the operator of the telecommunication system to set for which balances possible losses are acceptable and also to have control over the maximum losses that the operator is willing to accept. The usage of overbooking tends to enhance balance consumption prioritization so that a higher prioritized balance will be consumed first, when multiple balances are available for the subscriber.

Various embodiments described herein refer in some fashion to nodes, e.g., nodes which support functions associated with charging. In some embodiments the non-limiting communication node (also interchangeably called a node or telecommunication node) is more commonly used and it refers to any type of network node which directly or indirectly communicates with a user equipment (UE), a node in one or more operator networks, and a core network.

The disclosed embodiments provide methods and devices for overbooking resources associated with a charge or request for a service used by a subscriber in a telecommunication system. It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the claimed invention. However, one skilled in the art would understand that various embodiments may be practiced without such specific details.

Figure 8:
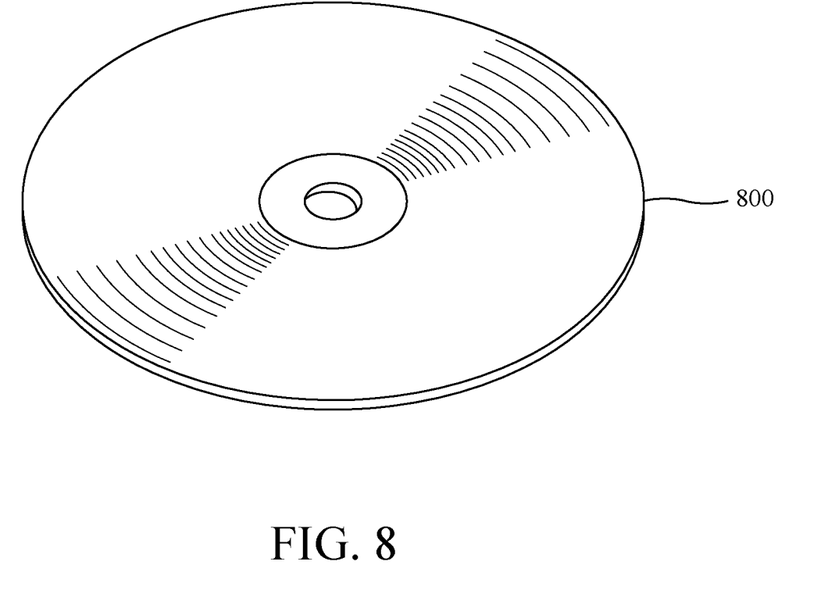
FIG. 8 depicts an electronic storage medium on which computer program embodiments can be stored.

As also will be appreciated by one skilled in the art, the embodiments may take the form of an entirely hardware embodiment or an embodiment combining hardware and software aspects. Further, the embodiments, e.g., the configurations and other logic associated with the charging process to include embodiments described herein, such as, the methods associated with FIG. 6, may take the form of a computer program product stored on a computer-readable storage medium having computer-readable instructions embodied in the medium. For example, FIG. 8 depicts an electronic storage medium 800 on which computer program embodiments can be stored. Any suitable computer-readable medium may be utilized, including hard disks, CD-ROMs, digital versatile disc (DVD), optical storage devices, or magnetic storage devices such as floppy disk or magnetic tape. Other non-limiting examples of computer-readable media include flash-type memories or other known memories.

Although the features and elements of the present embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a specifically programmed computer or processor.

What is claimed is:

1. A method for reserving resources in a telecommunication network, the method comprising:
   receiving, at a node, a first service request to reserve a quantity of resources from a subscriber's first account, wherein the quantity of resources requested to be reserved are greater than an amount of available resources in the subscriber's first account;
   determining, at the node, that the quantity of resources needed to be reserved is within an overbooking limit associated with the subscriber's first account;
   reserving, based on the determining step, the requested quantity of resources;
   deducting, by the node when the resources associated with actual usage of the first service request are less than or equal to a total amount of resources associated with all of the subscriber's accounts, resources from the subscriber's first account followed by resources from the subscriber's one or more other accounts based on a priority order; and
   deducting, by the node when the resources associated with actual usage of the first service request are greater than the total amount of resources associated with all of the subscriber's accounts, all of the resources from the subscriber's accounts and initiating a charge towards the subscriber for a difference in resources deducted from the subscriber's accounts and the resources used in the first service request.

2. The method of claim 1, wherein the step of determining that the quantity of resources needed to be reserved is within the overbooking limit associated with the subscriber's first account is based on an overbooking resource amount associated with the subscriber's first account.

3. The method of claim 1, wherein the priority order is determined by an operator of the telecommunication network.

4. The method of claim 1, further comprising:
   transmitting, from the node, a reauthorization message indicating reauthorization of resources associated with an account of the subscriber which lost reserved resources due to the deduction of resources associated with the first service request.

5. The method of claim 1, wherein the node is an Online Charging Function (OCF) node.

6. The method of claim 1, wherein the resources are monetary resources and/or non-monetary resources.

7. The method of claim 6, wherein the non-monetary resources are data quantities.

8. The method of claim 1, wherein the overbooking limit associated with the subscriber is personalized to each subscriber by an operator of the telecommunications network.

9. A node for reserving resources in a telecommunication network, the node comprising:
   a communication interface configured to receive a first service request to reserve a quantity of resources from a subscriber's first account, wherein the quantity of resources requested to be reserved are greater than an amount of available resources in the subscriber's first account;
   a processor configured to determine that the quantity of resources needed to be reserved is within an overbooking limit associated with the subscriber's first account;
   the processor configured to reserve, based on the determining step, the requested quantity of resources;
   the processor configured to deduct when the resources associated with actual usage of the first service request are less than or equal to a total amount of resources associated with all of the subscriber's accounts, resources from the subscriber's first account followed by resources from the subscriber's one or more other accounts based on a priority order; and
   the processor configured to deduct when the resources associated with actual usage of the first service request are greater than the total amount of resources associated with all of the subscriber's accounts, all of the resources from the subscriber's accounts and initiating a charge towards the subscriber for a difference in resources deducted from the subscriber's accounts and the resources used in the first service request.

10. The node of claim 9, wherein to determine that the quantity of resources needed to be reserved is within the overbooking limit associated with the subscriber's first account is based on an overbooking resource amount associated with the subscriber's first account.

11. The node of claim 10, wherein the priority order is determined by an operator of the telecommunication network.

12. The node of claim 9, further comprising:
    the communication interface configured to transmit a reauthorization message indicating reauthorization of resources associated with an account of the subscriber which lost reserved resources due to the deduction of resources associated with the first service request.

13. The node of claim 9, wherein the node is an Online Charging Function (OCF) node.

14. The node of claim 9, wherein the resources are monetary resources and/or non-monetary resources.

15. The node of claim 14, wherein the non-monetary resources are data quantities.

16. The node of claim 9, wherein the overbooking limit associated with the subscriber is personalized to each subscriber by an operator of the telecommunications network.

17. A non-transitory computer-readable storage medium containing a computer-readable code that when read by a processor causes the processor to perform a method for reserving resources in a telecommunication network, the method comprising:
    receiving, at a node, a first service request to reserve a quantity of resources from a subscriber's first account, wherein the quantity of resources requested to be reserved are greater than an amount of available resources in the subscriber's first account;
    determining, at the node, that the quantity of resources needed to be reserved is within an overbooking limit associated with the subscriber's first account;

reserving, based on the determining step, the requested quantity of resources;

deducting, by the node when the resources associated with actual usage of the first service request are less than or equal to a total amount of resources associated with all of the subscriber's accounts, resources from the subscriber's first account followed by resources from the subscriber's one or more other accounts based on a priority order; and deducting, by the node when the resources associated with actual usage of the first service request are greater than the total amount of resources associated with all of the subscriber's accounts, all of the resources from the subscriber's accounts and initiating a charge towards the subscriber for a difference in resources deducted from the subscriber's accounts and the resources used in the first service request.

18. An apparatus comprising:

an interface configured to receive a first service request to reserve a quantity of resources from a subscriber's first account, wherein the quantity of resources requested to be reserved are greater than an amount of available resources in the subscriber's first account;

a processor configured to determine that the quantity of resources needed to be reserved is within an overbooking limit associated with the subscriber's first account;

the processor configured to reserve, based on the determining step, the requested quantity of resources;

the processor configured to deduct when the resources associated with actual usage of the first service request are less than or equal to a total amount of resources associated with all of the subscriber's accounts, resources from the subscriber's first account followed by resources from the subscriber's one or more other accounts based on a priority order; and the processor configured to deduct when the resources associated with actual usage of the first service request are greater than the total amount of resources associated with all of the subscriber's accounts, all of the resources from the subscriber's accounts and initiating a charge towards the subscriber for a difference in resources deducted from the subscriber's accounts and the resources used in the first service request.

19. The method of claim 1, wherein the step of determining that the quantity of resources needed to be reserved is within the overbooking limit associated with the subscriber's first account is based on an amount of unreserved resources in one or more other accounts than the first account of the subscriber.

20. The node of claim 9, wherein to determine that the quantity of resources needed to be reserved is within the overbooking limit associated with the subscriber's first account is based on an amount of unreserved resources in one or more other accounts than the first account of the subscriber.

* * * * *